United States Patent [19]

Beck et al.

[11] 3,903,170
[45] Sept. 2, 1975

[54] ANTHRYL SUBSTITUTED ACROLEIN COMPOUNDS

[75] Inventors: Dieter Beck, Basel; Raymond Bernasconi, Oberwil, Basel-Land; Karl Schenker, Binningen; Max Wilhelm, Allschwil, all of Switzerland

[73] Assignee: Ciba-Geigy Corporation, Ardsley, N.Y.

[22] Filed: Jan. 14, 1974

[21] Appl. No.: 432,927

Related U.S. Application Data
[62] Division of Ser. No. 225,614, Feb. 11, 1972.

[30]    Foreign Application Priority Data
    Feb. 23, 1971   Switzerland.......................... 2576/71
    Jan. 17, 1972   Switzerland............................ 667/72

[52] U.S. Cl.................................. 260/599; 260/600
[51] Int. Cl... C07c 45/00; C07c 47/00; C07c 47/56
[58] Field of Search............................ 260/599, 600

[56]    References Cited
    UNITED STATES PATENTS
    3,399,201   8/1968   Schmidt et al.................. 260/599 X
    3,632,653   1/1972   Schmidt et al....................... 260/599

*Primary Examiner*—Bernard Helfin
*Attorney, Agent, or Firm*—Joseph G. Kolodny; Theodore O. Groeger; John J. Maitner

[57]    ABSTRACT

9-(3-Oxo-1-propenyl)-9,10-dihydro-9,10-ethano-anthracenes possessing a nucleus of the formula

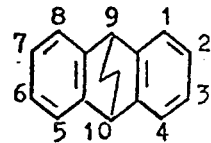

(I)

and their salts are useful as intermediate products for the manufacture of valuable compounds, especially pharmaceutically active compounds.

5 Claims, No Drawings

ANTHRYL SUBSTITUTED ACROLEIN COMPOUNDS

This application is a division of application Ser. No. 225,614, filed Feb. 11, 1972.

SUMMARY OF THE INVENTION

The present invention relates to cyclic compounds and a process for their manufacture.

The present invention provides 9-(3-oxo-1-propenyl)-9,10-dihydro-9,10-ethano-anthracenes possessing a nucleus of the formula

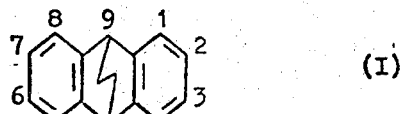
(I)

The 1-propenyl radical present as a substituent in the 9-position of the anthracene nucleus is preferably only substituted by the oxo group, but may also be further substituted by lower alkyl radicals, for example, those mentioned below, especially by methyl or ethyl radicals. The 1-propenyl radical preferably does not possess more than one such lower alkyl radical as a substituent.

The term "lower" is used here and throughout the specification to denote such alkyl groups and other aliphatic radicals, for example, alkenyl, alkoxy and alkanoyl groups, as contain up to 7, and preferably not more than 4 carbon atoms.

Lower alkyl radicals are accordingly methyl, ethyl, propyl and isopropyl radicals, and straight or branched chain butyl, pentyl, hexyl or heptyl radicals bonded in any desired position.

In the compounds of the invention, the positions 11 and/or 12 may be substituted by lower alkyl radicals, for example, those mentioned, but the positions 11 and 12 are preferably unsubstituted.

The compounds of the invention are preferably unsubstituted in positions 1 to 8 of the anthracene ring but may carry substituents in these positions, for example, substituents selected from lower alkyl, lower alkoxy, lower alkenyloxy, lower alkylmercapto, lower alkylsulphonyl, lower alkanoyl, nitro, and amino groups, but preferably trifluoromethyl groups or halogen atoms, for example, fluorine, bromine and iodine and particularly chlorine atoms; as alkyl radicals, methyl, ethyl, propyl, isopropyl, butyl iso-butyl and tertiary butyl radicals should be mentioned especially; as alkoxy or alkenyloxy groups methoxy, ethoxy, allyloxy and methylenedioxy groups should be mentioned; as alkymercapto groups methylmercapto and ethylmercapto groups should be mentioned; and as alkanoyl radicals acetyl, propionyl and butyryl radicals should above all be mentioned. The substitution in positions 1 to 8 may be multiple, but is preferably double, and advantageously single. Preferred positions of substituents are the 3-position and especially the 2-position.

The compounds of the invention may be substituted in the 10-position by a lower alkyl radical, for example, one of those mentioned above, or a halogen atom, above all a chlorine atom, but this position is preferably unsubstituted.

The invention also provides functional derivatives of the compounds of the invention, for example, their acetals, hydrates, oximes, hydrazones, semicarbazones or bisulphite addition products, also form a subject of the invention.

The compounds of the invention are useful as intermediate products for the manufacture of valuable compounds, especially pharmaceutically active compounds, for example, the psychotropically active compound 9-(γ-aminopropyl)-9,10-dihydro-9,10-ethano-anthracenes (described in U.S. Pat. No. 3,399,201) which can be formed, for example by the reaction of the new compounds prepared according to the procedure described in this specification with a primary or secondary amine and subsequent hydrogenation of the formed azomethine or hydroxyamino-compound.

The compounds of the invention which are particularly useful as intermediates are compounds of the formula Ia

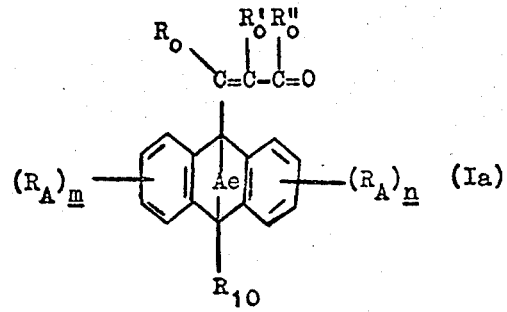

in which $n$ and $m$ each denote an integer from 0 to 4, ($n + m$) preferably being not greater than 3, $m$ preferably representing 0 and $n$ for example, representing 2, but advantageously 1 and especially 0, the radicals $R_A$, which may be the same or different, each represents a radical selected from the groups mentioned above as substituents of the positions 1 to 8, and a single substituent $R_A$ is preferably in the 3-position or especially in the 2-position, $R_{10}$ denotes one of the groups mentioned above as substituents of the 10-position or especially denotes a hydrogen atom, the symbols $R_o$, $R_o'$ and $R_o''$, which may be the same or different, each represents a lower alkyl radical, for example, those mentioned, for example, ethyl groups, preferably methyl groups, or especially represents a hydrogen atom, with preferably at most one of the three symbols being different from hydrogen, and Ae denotes a 1,2-ethylene radical which is substituted in the 1-position and/or 2-position by a lower alkyl radical, for example, by one of those mentioned for example, a methyl, ethyl, propyl or isopropyl radical, but is preferably unsubstituted.

Particularly important intermediate products are those compounds of the formula Ia, where $R_A$ denotes lower alkyl, lower alkoxy, trifluoromethyl groups or, preferably, halogen atoms, for example, bromine atoms or especially chlorine atoms, and $R_{10}$ denotes a halogen atom, preferably a chlorine atom, or above all a hydrogen atom.

Further compounds which are especially useful are those of the formula II

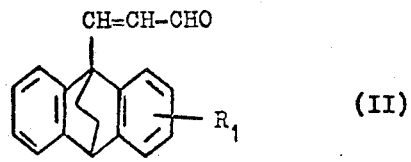
(II)

wherein the group $R_1$ is in the 3-position or preferably in the 2-position and denotes a lower alkyl or lower alkoxy group, a trifluoromethyl group, a bromine atom or especially a chlorine atom, but advantageously a hydrogen atom.

Particularly valuable intermediate products are the compounds of the formula III

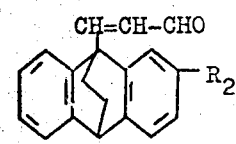

(III)

wherein $R_2$ represents a methoxy group or a trifluoromethyl group, but preferably a chlorine atom and advantageously a hydrogen atom, and especially 9-(3-oxo-1-propenyl)-9,10-dihydro-9,10-ethano-anthracene of the formula

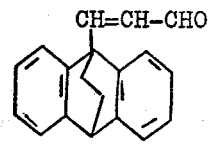

(IV)

from which 9-(3-methylaminopropyl)-9,10-dihydro-9,10-ethano-anthracene (see British Patent 1,069,069) can be obtained, for example, by reaction with methylamine and hydrogenation in the presence of palladium on charcoal.

Attempts to manufacture the compounds of the invention starting from the known 9-formyl-9,10-dihydro-9,10-ethano-anthracenes by acetalisation, chain lengthening by reaction with vinyl ethyl ether and acid hydrolysis of the product formed, failed. The addition of ethylene which was unsubstituted or loweralkylated to appropriate 3-(9-aathryl)-acrolein compounds appeared unpromising, since participation of the activated double bond of the side chain, as part of a diene system, was to be expected. In fact, the reaction of ethylene with 3-(9-anthryl)-acrolein in dimethylformamide gave a mixture of a large number of compounds.

The present invention also provides a process for the manufacture of a 9-(3-oxo-1-propenyl)-9,10-dihydro-9,10-ethano-anthracene possessing a necleus of the formula

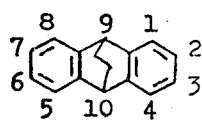

which comprises reacting the corresponding 3-(9-anthryl)-acrolein with ethylene, which may be lower alkylated, in the presence of an inert, heat-stable solvent.

Surprisingly, compounds of the invention are obtained in good yield and in a pure form.

As inert, heat-stable solvents, there may be mentioned, for example, hydrocarbons, for example, aliphatic, cycloaliphatic or above all, aromatic hydrocarbons, for example an alkane, or a cyclolkane having a molecular weight of above 80, cycloalkane which may be lower alkylated, for example, methylated, or a xylene, benzene, cumene or, especially, toluene.

Further examples to be mentioned are saturated alcohols, for example, alkanols or cycloalkanols, for example, ethanol or isopropanol; preferably aliphatic nitriles, for example, acetonitrile; carboxylic acids and especially esters thereof, for example, lower alkanecarboxylic acids and their esters, for example ethylacetate, aromatic nitro compounds, for example nitrobenzene and aromatic ethers, for example, diphenyl ether.

The reaction is advantageously carried out under pressure, for example, under a pressure of from 20 to 200, and preferably from 70 to 100, atmospheres, and with warming, for example at a temperature of from 50° to 220°, especially at a temperature of from 150° to 220°.

A resulting 9-(3-oxo-1-propenyl)-9,10-dihydro-9,10-ethano-anthracene can be converted into a reactive functional derivative thereof, above all those mentioned, by, for example, adding an alcohol, water, hydroxylamine, hydrazine, semicarbazide or bisulphite, where appropriate with elimination of water. Conversely, the free aldehyde or ketone may be formed from a resulting derivative of this nature, for example, by acid hydrolysis.

The invention also provides a process for the manufacture of a 9-(3-aminopropyl)- or 9-(3-amino-1-propenyl)-9,10-dihydro-9,10-ethanoanthracene which comprises condensing a 9-(3-oxo-1-propenyl)-9,10-dihydro-9,10-ethanoanthracene with an amine and partially or completely hydrogenating the resulting compound.

The invention further provides the 3-(9-anthryl)-acrolein compounds (V)

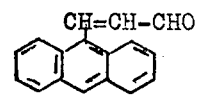

(V)

used as starting substances, which can be substituted in positions 1 to 9 of the anthracene skeleton and/or in the aliphatic side chain, for example, as indicated above for 9(3-oxo-1-propenyl)-9,10-dihydro-9,10-ethano-anthracenes, and their functional derivatives, for example, their acetals, hydrates, oxames, hydrazones, semicarbazones and bisulphite addition products. Surprisingly, they are stable compounds, which was not to be expected because of their numerous conjugated double bonds.

Starting substances of this nature are, for example, compounds of the formula

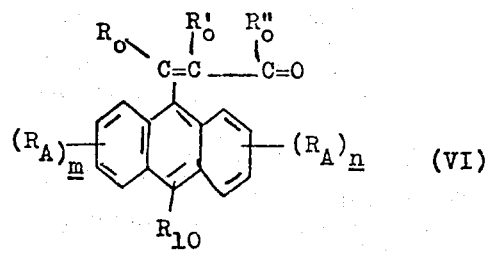

(VI)

wherein $m$, $n$, $R_4$, $R_o$, $R_o'$, $R_o''$ and $R_{10}$ have the meanings indicated above when defining the nature of the substituents in the formula Ia.

Particularly improtant starting substances are those compounds of the formula (VI) wherein $R_4$ denotes a lower alkyl, lower alkoxy, trifluoromethyl group or, preferably, a halogen atom, for example a bromine atom or especially a chlorine atom, and $R_{10}$ denotes a halogen atom, preferably a chlorine atom, or advantageous a hydrogen atom.

Starting substances to be particularly mentioned are those of the formula (VII)

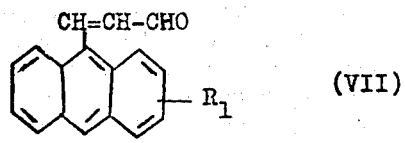

(VII)

wherein $R_1$ has the above mentioned meanings and is in the 3-position or is preferably in the 2-position.

Particularly valuable starting products are the compounds of the formula (VIII)

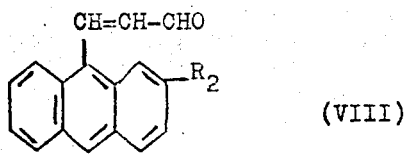

(VIII)

wherein $R_2$ has the above mentioned meanings.

As already mentioned above, it had proved impossible to manufacture 9-(3-oxo-1-propenyl)-9,10-dihydro-9,10-ethanoanthracenes starting from the corresponding 9-formyl compounds by acetalisation, chain lengthening by reaction with vinyl ethyl ether and acid hydrolysis of the product formed. It was therefore to be expected that the manufacture of the 3-(9-anthryl)-acrolein compounds (V) would be possible only with complicated multi-stage syntheses.

The present invention provides a process for the manufacture of a 3-(9-antryl)-acrolein compound (V) which comprises acetalizing a corresponding 9-formyl-anthracene compound reacting the acetal with an ethenyl ether or ethenyl ester, for example, a vinyl ether or a vinyl -anthryl)-acrolein and decomposing the resulting condensation product IX with an aqueous acid. The yield is good.

The alcoholic component of the acetal is preferably a lower alkanol, for example, propanol, methanol and advantageously ethanol. The acetalisation is, for example, effected with the aid of an ortho-ester, especially with the aid of an ortho-ester of a lower alkanoic acid, for example, formic acid or acetic acid, preferably by reaction with orthoformic acid triethyl ester. The reaction is appropriately carried out in the presence of a catalyst, especially an acid catalyst, for example, boron trifluoride, for example, in the form of boron trifluoridediethyl-etherate. The ethenyl-ether is preferably an ethenyl-lower alkyl ether, for example, an ethenyl-ethyl ether, for example, vinyl-ethyl ether, and is advantageously only employed in slight excess. An ethenyl ester, particularly such an ester of a carboxylic acid, preferably of a lower alkanoic acid, for example vinyl acetate or vinyl formate, and is advantageously employed only in a slight excess. The decomposition of the resulting alkoxy acetals can appropriately be effected in the presence of a solvent, especially an organic solvent, for example, a lower alkanol, for example, isopropanol. As the acid, any desired inorganic or organic acid, for example a fairly strong or preferably a strong acid, can be used, for example a mineral acid, for example perchloric acid, sulphuric acid or especially hydrochloric acid; or a carboxylic acid, for example, a lower alkanecarboxylic acid, for example, acetic acid; or an organic sulphonic acid, for example, an alkanesulphonic acid, for example, methanesulphonic acid; or an arylsulphonic acid, for example, p-toluenesulphonic acid or p-bromobenzenesulphonic acid.

A resulting 3-(9-anthryl)-acrolein compound (V) can be converted into a reactive functional derivative thereof, especially into those indicated, by adding for example, an alcohol, water, hydroxylamine, hydrazine, semicarbazide or bisulphite, where appropriate with elimination of water. Conversely, the free aldehyde or detone can be formed from resulting derivatives of this nature, for example, by acid hydrolysis.

The 3-(9-anthryl)-acrolein compounds V can also serve for the synthesis of the initially mentioned 9-(3-imino-1-propenyl)-9,10-dihydro-9,10-ethano-anthracenes by a different route than via the 9-(3-oxo-1-propenyl)-9,10-dihydro-9,10-ethano-anthracenes which by themselves can serve as starting materials for the above mentioned 9-(3-amino-propyl)-9,10-dihydro-9,10-ethano-anthracenes. Thus, the invention provides a process for the manufacture of a 9-(3-imino-1-propenyl)-9,10-dihydro-9,10-ethano-anthracene which comprises condensing a 3-(9-anthryl)-acrolein compound V with a suitable amine and reacting the resulting Schiff's base with an ethylene which may be unsubstituted or lower alkylated.

The invention further provides a process for the manufacture of a 9-(3-oxo-1-propenyl)-9,10-dihydro-9,10ethanoanthracene wherein the process for preparing a 3-(9-anthryl)-acrolein compound V from a corresponding 9-formyl-anthracene and the conversion of the acrolein compound to a 9-(3-oxo-1-propenyl)-9,10-dihydro-9,10-ethano-anthracene are carried out in succession, that is to say an appropriate 9-formyl-anthracene compound is acetalized, the acetal is reacted with an ethenyl-ether or ethenyl-ester, the resulting condensation product IX is decomposed with an aqueous acid and the resulting 3-(9-anthryl)-acrolein compound is reacted with ethylene which may be lower alkylated in the presence of inert heat-stable solvents.

The following Examples illustrate the invention.

EXAMPLE 1

0.8 ml of $BF_3$-diethyl-etherate is added to 137.1 g of orthoformic acid triethyl ester, and 164.8 g of anthracene-9-aldehyde are then added in several portions, whilst stirring. The resulting yellow paste is warmed to 40°–45°C, whereby a viscous brown-red solution is gradually produced. After 2 hours, cooling of the contents of the flask is started and at the same time 63.4 g of ethyl vinyl ether are added dropwise at such a speed that the temperature of the reaction mixture does not exceed 20°C. After 2 hours, 161 ml of isopropanol and 24 ml of 2N hydrochloric acid are added and the mixture is heated under reflux for 8 hours. After about 1–2 hours the product already starts to crystallise out relatively rapidly. The mixture is cooled to 5°C and the deep yellow fine crystals are filtered off. They are washed with two 80 ml portions of isopropanol, once with 80 ml of water and again with 80 ml of isopropanol, and the 3-(9-anthryl)-acrolein thus obtained, of the formula

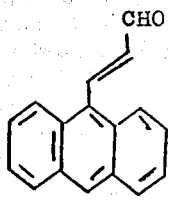

is dried for 12 hours at 80 mm Hg/80°C in a vacuum cabinet, until it reaches constant weight. The substance is golden yellow and melts at 172°–174°C, and after one recrystallisation from chloroform-ethyl acetate it melts at 174°–175°C. The yield is 171 g (92 percent of theory).

EXAMPLE 2

232 g (1.0 mol) of 3-(9-anthryl)-acrolein and 1,000 ml of toluene are heated to 170°–180°C in a stirred autoclave. Ethylene is injected until the pressure reaches 100 atmospheres gague and this pressure is maintained for 20 hours. The pressure vessel is allowed to cool to 90°C, the pressure is carefully released, 20 g of active charcoal are added to the contents of the autoclave and the warm solution is filtered. The filtrate is avaporated to approximately three-fifths of its volume and is then slowly cooled to 10°C. Hereupon 9-(3-oxo-1-propenyl)-9,10-dihydro-9,10-ethano-anthracene of the formula

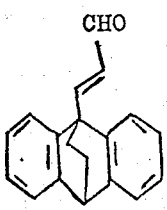

crystallises out. It is filtered off and rinsed with a total of 400 ml of ice-cold toluene. The colourless crystals are dried in a vacuum cabinet at 80 mm Hg/100°C to constant weight (15 hours). The yield is 234.2 g (92 percent of theory) and the melting point is 174°–176°C. A single recrystallisation from chloroform-ether yields colourless crystals of melting point 175.5°–177°C.

Yet further material can be obtained by concentrating the mother liquor.

EXAMPLE 3

46.8 g of 9,10-dihydro-9,10-ethanoanthracene-9-aldehyde in a mixture of 29.6 g of orthoformic acid triethyl ester, 0.01 g of p-toluenesulphonic acid and 10 ml of absolute alcohol are stirred for 10 hours at room temperature. The clear solution is mixed with 100 ml of ethyl acetate and washed with 20 ml of sodium bicarbonate solution. After drying over potassium carbonate, the ethyl acetate is distilled off and the residue is triturated with 30 ml of absolute ethanol. 60.5 g of 9,1-0-dihydro-9,10-ethanoanthracene-9-aldehyde-diethylacetal of the formula

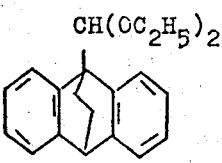

and of melting point 125°–126°C are thus obtained.

30.8 g of 9,10-dihydro-9,10-ethanoanthracene-9-aldehydediethyl acetal are dissolved in 50 ml of chloroform. After adding 0.3 ml of boron trifluoride-etherate, 20 ml of vinyl ethyl ether are added dropwise to this mixture, the temperature constantly being 20°C. The dark reaction mixture is washed with sodium bicarbonate solution and water, and after drying over sodium sulphate the solution is evaporated. The residue is triturated with a little ethanol and in two crystallisations 30 g of starting material are recovered. No product resulting from chain lengthening is detectable by thin layer chromatography in the mother liquor which remains.

EXAMPLE 4

8.2 g of 3-(9-anthryl)-acrolein are dissolved in 150 ml of anhydrous dimethylformamide in a 500 ml pressure autoclave equipped with a magnetic stirrer. Ethylene is injected at room temperature until the pressure reaches 40 atmospheres gauge and the autoclave is then heated to 170°C, in the course of which the internal pressure of the autoclave rises to approximately 75 atmospheres gauge. After 20 hours the mixture is worked up. The reaction mixture, which is dark brown in colour, is freed of the solvent in vacuo and the resinous residue (11.4 g) is chromatographed on 250 g of silica gel. Fractional elution with benzene yields 0.5 g of a fraction which, based on the infra-red spectrum and on analysis by thin layer chromatography, consists of about half of the desired 9-(3-oxo-1-propenyl)-9,10-dihydro-9,10-ethano-anthracene of the formula

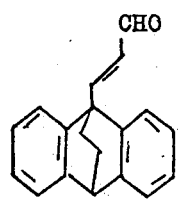

described in Example 2. The remainder of the reaction mixture consists of at least ten compounds or resins which were not characterised in more detail.

EXAMPLE 5

50 g of 3-(9-anthryl)-acrolein in 400 ml of isopropanol are heated to 170°C in a 1 1 pressure autoclave equipped with a magnetic stirrer. Ethylene is injected until the pressure reaches 80 atmospheres gauge and the mixture is stirred for a further 20 hours at 170°C. After cooling, the crystalline paste is filtered off, washed with a total of 300 ml of ice-cold isopropanol and subsequently dried to constant weight in vacuo at 80°C. 36.5 g (62.5% of theory) of brownish-coloured crystals of 9-(3-oxo1-propenyl)-9,10-dihydro-9,10ethano-anthracene, of melting point 173°–175°C, identical with the product obtained according to Example 2, are obtained.

EXAMPLE 6

50 g of 3-(9-anthryl)-acrolein in 200 ml of acetonitrile are heated to 170°C in a 500 ml pressure autoclave equipped with a magnetic stirrer. Ethylene is then injected up to a a total pressure of 80 atmospheres gauge and the mixture is allowed to react for 20 hours at 170°–180°C, whilst stirring. The contents of the autoclave are cooled to 80°C and the darkcoloured reaction solution is treated with 5 g of active charcoal (Norit) and filtered. The filtrate is concentrated to half its original volume at 50 mm Hg and is then cooled to 5°C, whereupon 9-(3-oxo-1-propenyl)-9,10-dihydro-9,10-ethanoanthracene precipitates as light brown crystals. These are filtered off, thoroughly rinsed with a total of 150 ml of cold toluene and dried to constant weight in vacuo. Yield: 40.1 g (= 71.5 percent of theory) of brownish-coloured crystals of melting point 173°–175°C, which are identical to the product described in Example 2.

3-[9-(2-Chloro)-anthryl]-acrolein can also be manufactured analogously to the description in Example 1, and 2-chloro-9-(3-oxo-1-propenyl)-9,10-dihydro-9,10-ethano-anthracene can be obtained therefrom by reaction with ethylene as described in this example or in Examples 2 or 5.

EXAMPLE 7

Gaseous methylamine is introduced into a suspension of 26.0 g 9-(3-oxo-1-propenyl)-9,10-dihydro-9,10-ethano-anthracene in 200 ml of methanol, whilst stirring. The aldehyde dissolves whilst the mixture becomes warm. The temperature of the reaction mixture rises to 50°–55°C over the course of a few minutes. As soon as the solution becomes strongly alkaline (tested with moist indicator paper), the introduction of methylamine is stopped and the solution is left to stand for 30 minutes. On slowly adding 100 ml of water, 9-(3-methylimino-1-propenyl)-9,10-dihydro-9,10-ethano-anthracene of the formula

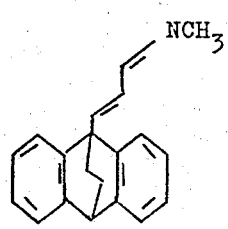

precipitates in the form of crystals. The mixture is cooled to 10°C and suction-filtered, and 26.2 g of colourless crystals of melting point 128°–129°C are thus obtained.

EXAMPLE 8

A mixture of 11.6 g of 3-(9-anthryl)-acrolein and 9.1 g of 33 percent strength ethanolic methylamine in 80 ml of absolute ethanol is stirred for 20 minutes and at the same time gradually warmed to 40°C. The clear, brown-yellow solution is cooled to 0°C, whereupon dark yellow crystals separate out. These are filtered off and recrystallised from 15 ml of isopropanol and 5 ml of ethyl acetate. 9-(3-Methylimino-1-propenyl)-anthracene of the formula

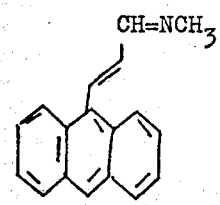

is thus obtained as yellow needles of melting point 122.5°–124.5°C.

EXAMPLE 9

12.25 g of 9-(3-methylimino-1-propenyl)-anthracene in 150 ml of toluene are heated to 180°C in an autoclave. Hot ethylene is injected until the pressure reaches 80 atmospheres gauge and the reaction mixture is left to stand for 20 hours at a pressure of 80 atmospheres gauge and a temperature of 180°C. The mixture is cooled and evaporated in vacuo. Crude 9-(3-methyl-imino-1-propenyl)-9,10-dihydro-9,10-ethano-anthracene of the formula

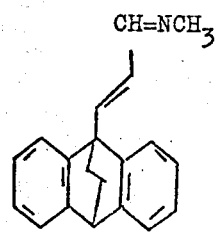

is thus obtained as a brownish amorphous mass.

A sample is crystallised from methanol and recrystallised. The colourless crystals, of melting point 128°–129°C, are identical in every respect with those described in Example 7.

EXAMPLE 10

To 137.1 g ethyl orthoformate are added 0.8 ml BF$_3$-etherate and then with stirring 164.8 g anthracene-9-aldehyde in several portions. The resulting yellow paste is heated to 40°–45° whereby slowly a viscous brown-red solution results. After 2 hours, the reaction mixture is cooled down and simultaneously dropwise 81.5 ml vinyl acetate is added. The resulting mixture is heated with stirring at 60° for 10 hours. Then 161 ml isopropanol and 24 ml 2N hydrochloric acid are added After the mixture is refluxed for 8 hours. After cooling to 5°, the yellow, fine crystals are filtered off by suction, washed twice with 80 ml portions of isopropanol, once with 80 ml of water and once more with 80 ml of isopropanol and sucked dry. The obtained product is a mixture of anthracene-9-aldehyde and the desired 3-(9-anthryl)-acrolein (ratio about 2:1) which can be separated from this mixture by a chromatography on alumina (activity 2). It melts then at 170°–173° and after one recrystallization from chloroformethyl acetate at 173°–174°. It is in every respect identical with the product described in Example 1.

EXAMPLE 11

232 g (1.0 Mol) 3-(9-anthryl)-acrolein in 1000 ml ethyl acetate are heated in an autoclave provided with a stirrer to 170°–180°. 100 atmospheres gauge of ethylene are injected hot and the mixture is allowed to remain at this temperature and pressure for 20 hours. After cooling to 90°, the autoclave is opened, the content treated with 20 g of activated carbon and filtered while still warm. The filtrate is concentrated to about half its volume and then slowly cooled to 0°. During this procedure, the 9-(3-oxo-1-propenyl)-9,10-dihydro-9,10-ethano-anthracene crystallizes out and is filtered off by suction and washed with a total of 400 ml ethyl acetate. The resulting brownish crystals are dried to constant weight at 80 Torr and 100° (15 hours). The m.p. of 174°–175° of this crude product can be raised to 175.5°–177° by one recrystallization from chloroform-ether. The product is identical in every respect with the product described in Example 2.

Concentration of the mother liquor yields some more of the pure product.

EXAMPLE 12

13.65 g of 9-(3-methylimino-1-propenyl)-9,10-dihydro-9,10-ethano-anthracene are suspended in 150 ml of methanol. A solution of 4.0 g of sodium borohydride in 15 ml of water is added dropwise to this suspension whilst stirring and cooling with ice water. Whilst doing so, the temperature of the contents of the flask should not exceed 15°C. In the course of the reaction, the Schiff's base rapdily dissolves. After 30 minutes, the reduction is complete. 200 ml of water are added and the mixture is extracted with three 100 ml portions of methylene chloride. The combined extracts are extracted by shaking with 50 ml of water, dried over anhydrous sodium sulphate and freed of the solvent in a water pump vacuum. 9-(3-Methylamino-1-propenyl)-9,10-dihydro-9,10-ethano-anthracene of the formula

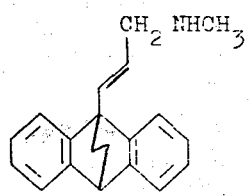

is thus obtained as a colourless viscous oil which crystallises on standing (melting point 78°–80°C).

The methanesulphonate of this compound is obtained as colourless crystals of melting point 168°–171°C, by neutralising an acetone solution of the base with methanesulphonic acid.

After recrystallisation from isopropanol, the hydrochloride melts at 243°–244°C.

EXAMPLE 13

The reaction sequence described in the two preceding examples can also be carried out in a one-pot process, as follows:

26.0 g of 9-(3-oxo-1-propenyl)-9,10-ethanoanthracene are converted into the Schiff's base by means of gaseous methylamine, as described in Example 7. The resulting methanolic solution of the Schiff's base is thereafter reduced, whilst stirring and cooling with ice water, by dropwise addition of a solution of 4.0 g of sodium borohydride in 15 ml of water. Working up takes place in the same manner as described in Example 8. 9-(3-Methylamino-1-propenyl)-9,10-dihydro-9,10-ethano-anthracene of the formula

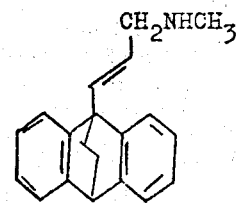

is obtained in the same yield, as a colourless oil. The methanesulphonate prepared therefrom melts at 168°–171°C and is identical in every respect with the product described in Example 12.

EXAMPLE 14

3.12 g of 9-(3-methylamino-1-propenyl)-9,10-dihydro-9,10-ethano-anthracene hydrochloride are hydrogenated in 50 ml of fine spirit in the presence of 0.3 g of 10percent strength palladium on charcoal, at 25°C and normal pressure. After 234 ml of hydrogen have been absorbed, the hydrogenation stops. The catalyst is filtered off and the solvent is evaporated in vacuo. 9-(3-Methyl-amino-propyl)-9,10-dihydro-9,10-ethano-anthracene hydrochloride of the formula

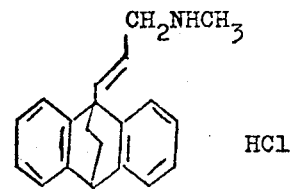

is thus obtained as colourless crystals of melting point 240°–243°C. After recrystallisation from isopropanol, the hydrochloride melts at 243°–244°C. It is identical in every respect with the product of the same melting point described in British Patent 1,069,069.

EXAMPLE 15

5.46 g of the 9-(3-methylimino-1-propenyl)-9,10-dihydro-9,10-ethano-anthracene described in Example 7, of melting point 128°–129°C, in 100 ml of fine spirit, are hydrogenated in a hydrogenation autoclave, in the presence of 1.0 g of Raney nickel (or 0.3 g of 10 percent strength palladium on charcoal) for 10 hours at 100°C and 100 atmospheres gauge hydrogen pressure. After cooling, the catalyst is filtered off and half of the solvent is distilled off in vacuo. A 2N solution of hydrogen chloride in ethyl acetate is then added to the solution until it gives a slightly acid reaction. Hereupon, 9-(3-methyl-aminopropyl)-9,10-dihydro-9,10-ethano-anthracene hydrochloride of the formula

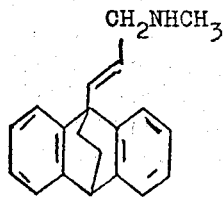

and of melting point 241°–243°C crystallises out. Recrystallisation from isopropanol gives colourless crystals of melting point 243°–244°C which are identical in every respect with the hydrochloride, of the same melting point, described in Example 14.

EXAMPLE 16

13.0 g of 9-(3-oxo-1-propenyl)-9,10-dihydro-9,10-ethano-anthracene are shaken in a high pressure hydrogenation autoclave with 100 ml of isopropanol, 19.7 ml of 35 percent strength aqueous methylamine and 1 g of 5 percent strength palladium on charcoal for 10 hours at 100°C, under a hydrogen pressure of 100 atmospheres gauge. After cooling, and releasing the pressure, the catalyst is filtered off and the filtrate is evaporated in vacuo. The residue is dissolved in 20 ml of hot isopropanol and the solution is rendered slightly acid with a 3N solution of hydrogen chloride in ethyl acetate. 9-(3-Methylaminopropyl)-9,10-dihydro-9,10-ethano-anthracene hydrochloride of the formula

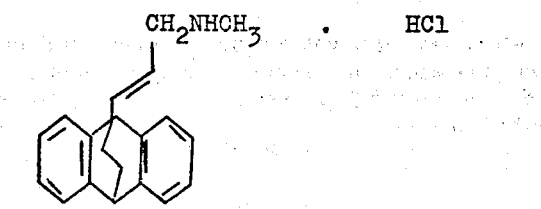

crystallises, after addition of 20 ml of ethyl acetate, in colourless prisms of melting point 243°–244°C. The hydrochloride is identical, in every respect, with the hydrochloride of the same melting point described in Examples 14 and 15.

EXAMPLE 17

The 9(3-methylimino-1-propenyl)-9,10-dihydro-9,10-ethano-anthracene obtained in Example 14 is suspended in methanol, and reduced with an aqueous solution of sodium borohydride whilst cooling with ice, as in Example 8. 9-(3-Methylamino-1-propenyl)-9,10-dihydro-9,10-ethano-anthracene of the formula

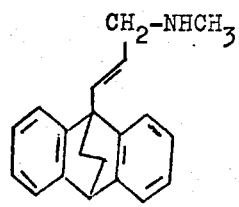

is thus obtained as a brownish amorphous mass.

The hydrochloride of the base is manufactured as follows:

The base is dissolved in a five-fold amount of acetone and neutralised by adding one equivalent of hydrogen chloride in ethyl acetate. Hereupon, the hydrochloride forms colourless crystals of melting point 241°–243°C. After recrystallisation from isopropanol-ether, the melting point rises to 243°–244°C. The hydrochloride is identical in every respect with the product described in Example 12.

EXAMPLE 18

3.8 g of sodium borohydride in 5 ml of water are added to a suspension of 12.25 g of 9(3-methylimino-1-propenyl)-anthracene whilst stirring and cooling in ice, the temperature not exceeding 15°C. The mixture is stirred for 30 minutes at 15°C, diluted with 200 ml of water and extracted with three 100 ml portions of methylene chloride. The combined extracts are washed with 50 ml of water, dried over anhydrous sodium sulphate and freed of the solvent in a water pump vacuum. 9-(3-Methylamino-1-propenyl)-anthracene of the formula

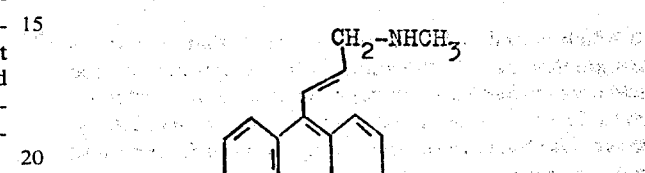

is thus obtained as a yellowish oil which crystallises completely on trituration. The hydrochloride of the base is manufactured as follows:

The base is dissolved in a five-fold amount of acetone and neutralised by adding one equivalent of hydrogen chloride in ethyl acetate. Hereupon, the hydrochloride crystallises out in lemon-yellow needles of melting point 277°–279°C. On recrystallisation from methanol-ethanol, the melting point rises to 284°–286°C.

EXAMPLE 19

12.35 g of 9-(3-methylamino-1-propenyl)-anthracene in 120 ml of toluene are heated to 200°C in an autoclave. 75 atmospheres gauge of ethylene are injected hot and the mixture is left to stand for 35 hours at a pressure of 75 atmospheres gauge and a temperature of 200°C. The brown solution is cooled, filtered through active charcoal and evaporated in vacuo. 1-(3-Methylamino-1-propenyl)-9,10-dihydro-9,10-ethano-anthracene of the formula

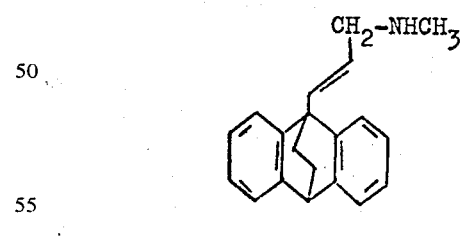

is thus obtained as a brownish amorphous mass.

The hydrochloride of the base is manufactured as in Example 5.

The hydrochloride forms slightly yellowish crystals of melting point 240°–242°C. After recrystallisation from chloroform-isopropanol-ether, colourless crystals of melting point 243°–244°C are obtained. The hydrochloride is identical in every respect with the product described in Example 12.

What is claimed is:

1. Compounds of the formula

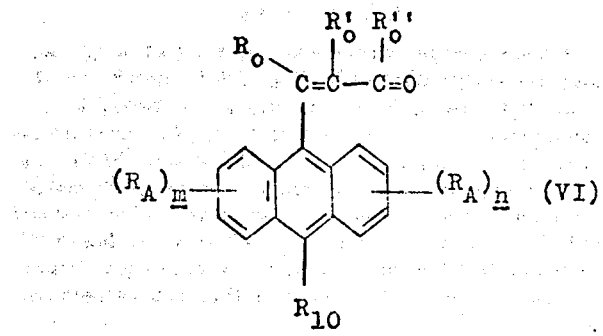

(VI)

in which $n$ and $m$ denote integers such that $(n + m)$ is not greater than 3, the radicals $R_A$, which may be the same or different, each represents a radical selected from lowerr alkyl, lower alkoxy, lower alkenyloxy, lower alkylmercapto, lower alkylsulphonyl, nitro and trifluoromethyl radicals and halogen atoms, $R_{10}$ denotes a hydrogen atom, a halogen atom or an alkyl radical and the symbols $R_o$, $R_o'$ and $R_o''$, which may be the same or different, each represents a lower alkyl radical or a hydrogen atom.

2. A compound as claimed in claim 1 wherein $R_A$ of the general formula represents lower alkyl, lower alkoxy, hydroxyl or trifluoromethyl groups or halogen atoms and $R_{10}$ denotes a chlorine atom or a hydrogen atom.

3. Compounds as claimed in claim 1 of the formula

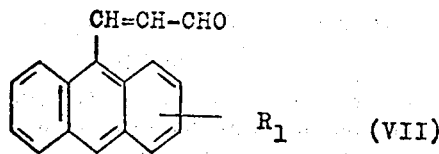

(VII)

wherein $R_1$ denotes a lower alkyl or lower alkoxy group, a trifluoromethyl group, a bromine or chlorine atom or a hydrogen atom, and is in the 2- or 3-position.

4. Compounds as claimed in claim 1 of the formula

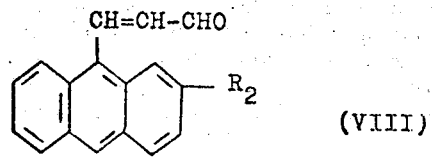

(VIII)

wherein $R_2$ represents a methoxy group, a trifluoromethyl group, a chlorine atom or a hydrogen atom.

5. 3-(9-Antrhyl)-acrolein, or 3-[9-(2-chloro)-anthryl]-acrolein.

* * * * *